United States Patent [19]
Springer

[11] 4,431,704
[45] Feb. 14, 1984

[54] COMPOSITION FOR BLOWOUT PREVENTER

[75] Inventor: Virgil E. Springer, Corsicana, Tex.

[73] Assignee: Regal International, Inc., Corsicana, Tex.

[21] Appl. No.: 480,066

[22] Filed: Mar. 29, 1983

[51] Int. Cl.³ ............... E21B 33/06; C08K 3/04; C08K 3/36
[52] U.S. Cl. ................... 428/450; 251/1 R; 251/1 A; 251/1 B; 277/73; 277/126; 277/127; 277/129; 277/185; 277/188 A; 277/199; 277/235 R; 428/457; 428/462; 523/130; 524/322; 524/432; 524/566
[58] Field of Search ............ 524/566, 432, 322; 523/130; 251/1 R, 1 A, 1 B; 277/188 A, 73, 235 R, 126, 127, 129, 185, 199; 166/326; 428/450, 457, 462

[56] References Cited

U.S. PATENT DOCUMENTS

| | | | |
|---|---|---|---|
| 3,897,039 | 7/1975 | Le Rouay | 277/127 |
| 4,089,532 | 5/1978 | Kamyshnikov et al. | 251/1 A |
| 4,323,256 | 4/1982 | Miyagishima et al. | 251/1 A |
| 4,339,359 | 7/1982 | Bezwada | 524/512 |
| 4,345,735 | 8/1982 | Regan | 277/188 A |
| 4,358,085 | 11/1982 | Regan | 277/235 |

Primary Examiner—Melvyn I. Marquis
Assistant Examiner—Herbert J. Lilling
Attorney, Agent, or Firm—Gerald G. Crutsinger; John F. Booth; Monty L. Ross

[57] ABSTRACT

A rubber composition for use in annular packer elements for blowout preventers is provided which comprises from about 45 to about 55 weight percent of an acrylonitrile-butadiene copolymer; from about 10 to about 15 weight percent of a first admixture further comprising a major amount of colloidal silica and minor effective amounts of coupling agent, curative, lubricant, dispersant, activator and antiscorching agent; from about 30 to about 40 weight percent of a second admixture further comprising a major amount of carbon black and minor effective amounts of a plasticizer, antioxidant and antiozonant; and minor effective amounts of tetraethyl thiuram disulfide and benzothiazyl disulfide.

24 Claims, No Drawings

COMPOSITION FOR BLOWOUT PREVENTER

TECHNICAL FIELD

This invention relates to rubber compositions, and more particularly, to the composition of rubber parts that are used in oil and gas well drilling operations. One aspect of the invention relates to a rubber composition that exhibits a superior combination of chemical, physical and mechanical properties, including for example, oil resistance, tear strength, tensile strength, compression set, rebound, elongation and modulus. According to another aspect of the invention, a rubber composition is provided that exhibits superior performance characteristics when fabricated into annular packers for blowout preventers. According to yet another aspect of the invention, a rubber compound is provided that can be utilized to manufacture blowout preventers having a useful life significantly greater than that experienced with structurally similar blowout preventers made with the conventional, prior art compositions. According to still another aspect of the invention, a method is provided for making the subject compositions.

BACKGROUND ART

Annular blowout preventers are well known to those familiar with oil or gas well drilling and completion operations. Blowout preventers are ordinarily disposed at the top of a well, just below the drilling floor, and are designed to seal off the hole in the event of a sudden increase in downhole pressure. Such an increase might occur, for example, when the drill bit breaks through a subterranean formation into a pocket of pressurized gas.

Blowout preventers are aligned with the well bore and typically comprise a housing containing one or more annular packer elements, along with a series of ram-type packers, maintained within a recess in the drilling floor. The packer elements of annular blowout preventers typically comprise a relatively massive annulus of rubber having relatively flat upper and lower surfaces, a beveled outer surface, and a centrally disposed, generally cylindrical opening. The rubber is typically molded around a plurality of circumferentially spaced-apart metal inserts comprising top and bottom transverse flange portions having vertically extending web portions disposed therebetween. The transverse flange portions are typically characterized by relatively major radial and circumferential dimensions and a relatively minor axial dimension, whereas the vertically extending web portions typically comprise relatively major radial and axial dimensions, and a relatively minor circumferential dimension. During normal drilling conditions, the packer element remains in a standby position with the drill string passing through its central opening. When in this position, sufficient space remains between the drill stem and the interior surface of the blowout preventer to permit circulation of drilling mud and the like. However, when pressure sensors disposed inside the well detect a sudden increase in downhole pressure, the packer element is adapted to be compressed inwardly around the drill stem, thereby sealing off the annular space in the well bore. Annular blowout preventers are preferably designed in such manner that if no drill stem is present in the central opening, the packer element will still compress sufficiently to seal off the hole. This is referred to as a blind closure. When the packer element is compressed, the metal inserts are squeezed into closer circumferential relation to each other, thereby squeezing the rubber that is disposed between adjacent inserts into the central opening.

Once the downhole pressure has been alleviated in a controlled manner, the hydraulic compressive force on the packer element is released, and it will desirably return to its previous configuration. For conventional Type GK blowout preventers, the normal useful life ranges up to about 30 cycles of operation. A blowout preventer is considered to have failed when it is no longer able to seal off a well bore when subjected to its rated pressure. Failure usually results when the metal inserts become delaminated from the surrounding rubber material, although other factors such as tearing, abrasion, and attack by oils or chemicals present in the drilling mud can also contribute to failure.

In the past, natural rubber, neoprene, and some other elastomers were utilized in making packer elements for blowout preventers. The use of such materials is disclosed, for example, in U.S. Pat. No. 2,609,836. More recently, nitrile rubbers, and more particularly, acrylonitrile-butadiene copolymers, have been recognized as providing a better overall balance of physical and chemical properties for use in this application. However, the costs associated with replacing packer elements in blowout preventers are significant, and there remains a great need for parts which demonstrate improved durability and longevity without an associated increase in part cost.

SUMMARY OF THE INVENTION

According to the present invention, compositions are provided for use in blowout preventers for oil or gas well drilling operations. The compositions disclosed herein are exceptionally durable and exhibit physical properties that are unexpectedly superior to those attainable through use of the conventional compositions.

According to a preferred embodiment of the invention, rubber compositions are provided that comprise a major portion of a cold, non-staining acrylonitrile-butadiene copolymer.

According to a preferred embodiment of the invention, the subject compositions further comprise carbon black and silica in a ratio of about 4 to 1 by weight, and are preferably made through use of a cure system employing tetraethyl thiuram disulfide and benzothiazyl disulfide in a ratio about 1 to 7.5 to effect a longer, slower cure.

According to a preferred embodiment, the compositions of the invention preferably comprise about 100 parts by weight of an acrylonitrile-butadiene copolymer, about 56 parts by weight carbon black, about 15 parts by weight silica, about 10 parts by weight coumarone-indene, about 5 parts by weight zinc oxide, about 3 parts by weight of a polymerized 1,2-dihydro-2,2,4-trimethyl-quinoline, about 1.5 parts by weight sulfur, about 1.5 parts by weight benzothiazyl disulfide, about 1 part by weight stearic acid, about 1 part by weight of an antiozonant, and about 0.2 parts by weight tetraethyl thiuram disulfide.

The blowout preventers made with the compositions disclosed herein and according to the methods of the invention are preferably transfer molded and step-cured under carefully controlled conditions to promote cross-linking. According to a preferred embodiment of the invention, the metal inserts for the subject blowout preventers are loaded into a transfer molding apparatus that is preheated to a temperature ranging from about 82 to about 93° C. (180°–200°F.). Pressure is applied and the rubber is thereafter compressed or forced through a series of screw holes in the transfer pot and molded around the metal inserts. Rubber is thereafter compression molded around the metal inserts at a pressure of about 2,000 psi and a temperature ranging up to about 126° C. (260° F.). The blowout preventer is cured for about three hours at 126° C. (260° F.) and for about three hours at 148° C. (300° F.) prior to removing it from the mold. Once the part is removed from the mold, it is preferably aged for at least about seven days, and more preferably, for about fourteen days at ambient temperatures to permit further crosslinking of the polymer during cooling.

Blowout preventers made according to the compositions and methods disclosed herein are characterized by their outstanding life expectancies and longevity. Whereas the commercially available blowout preventers made with conventional rubber compostions are able to hold pressure for up to about 30 closure cycles, and typically for about 20–25. The blowout preventers of the present invention are able to hold pressure for about 50–60 closure cycles, and in some instances, even more. The compositions and methods of the present invention, together with the unexpected improvements and benefits achieved thereby, are further explained and will be better understood upon reference to the detailed description and the examples set forth below.

DETAILED DESCRIPTION

The additive systems and processing conditions used in the preparation and manufacture of rubber compounds and rubber-containing products can have a significant effect on the physical properties of the finished product. It has long been known, for example, that the physical properties of rubber compounds are greatly affected by vulcanization. With respect to the present invention, it has now been discovered that unexpectedly superior blowout preventers can be produced when made in accordance with the formulations and the processing and curing parameters disclosed herein.

The compositions of the invention preferably comprise from about 45 to about 55 percent by weight of an elastomer that is more particularly a acrylonitrile-butadiene copolymer. Preferred elastomers for use in the compositions of the present invention are KRY-NAC 825 and Hycar 1051.

KRYNAC 825 is a registered trademark for a cold, non-staining acrylonitrile-butadiene copolymer manufactured by Polysar Ltd. of Sarnia, Ontario, Canada. KRYNAC 825 is represented by the manufacturer to have excellent oil resistance, a very fast cure rate, superior processing and vulcanizate properties, heat resistance, and virtual freedom from gel. Typical physical properties for the raw polymer are set forth in Table I below:

TABLE I

| | |
|---|---|
| Bound acrylonitrile (wt. %) | 36 |
| Polymerization type | cold, emulsion |
| Raw polymer viscosity, ASTM D 1646 (ML-1+4' at 100° C.) | 47 |
| Volatile matter, ASTM D 1416 (wt. %) | 0.2 |
| Total ash, ASTM D 1416 (wt. %) | 0.2 |
| Soluble ash, ASTM D 1416 (wt. %) | 0.1 |
| MEK solubility (wt. %) | 99.5 |
| Antioxidant | non-staining |
| Specific gravity | 0.98 |

Hycar 1051 is the tradename for an acrylonitrile-butadiene copolymer manufactured by B.F. Goodrich Chemical Company of Cleveland, Ohio. It is represented by the manufacturer to be polymerized at low temperature conditions, to contain sufficient antioxidant for normal aging conditions, and to have a high oil resistance. In the compositions of the present invention, good oil resistance is desirable due to the oil which may be present in the drilling fluids that are circulated past the interior surface of the blowout preventer. Published chemical properties for Hycar 1051 are set forth in Table II below:

TABLE II

| Analysis | Specification | Procedure No. |
|---|---|---|
| % Heat Loss | 0.7 max. | 362Fb/f |
| % Ash | 0.8 max. | 873Ba |
| Mooney Viscosity (ML-4' at 212° F.) | 60–75 | 404C |
| Cement Viscosity (Unmilled, Brookfield cps) | 6,500 max. | 328A |

The compositions of the invention preferably further comprise from about 10 to about 15 weight percent of a first admixture further comprising a major portion of fumed colloidal silica and a minor portion of a curative system further comprising a coupling agent, at least one curative agent, a lubricant or dispersant, and an activator which functions as an antiscorching agent.

According to one preferred embodiment of the invention, the first admixture further comprises from about 55 to about 65 weight percent fumed colloidal silica, from about 6 to about 10 weight percent curative, from about 4 to about 6 weight percent lubricant and dispersant, and from about 20 to about 25 weight percent activator and antiscorching agent. A preferred fumed colloidal silica for use in the compositions of the invention is marketed under the trademark Cab-O-Sil by Cabot Corporation of Boston, Massachusetts. A preferred coupling agent is bis,3, (triethoxysilyl)-propyl-tetrasulfane. A preferred curative for use in the first admixture of the invention is sulfur. A preferred lubricant and dispersant is stearic acid. A preferred activator and antiscorching agent for use in the compositions of the invention is a metallic oxide such as zinc oxide. According to one particularly preferred embodiment of the invention, the subject composition comprises about 12 weight percent of a first admixture further comprising about 60 weight percent Cab-O-Sil, about 4 weight percent bis,3,(triethoxysilyl)-propyl-tetrasulfane, about 7 weight percent sulfur, about 1 weight percent stearic acid, and about 22 weight percent zinc oxide.

In addition to the foregoing, the compositions of the invention preferably comprise from about 30 to about 40 weight percent of a second admixture preferably comprising a major portion of carbon black and minor effective amounts of plasticizer, antioxidant and an antiozonant. According to a preferred embodiment of the invention, the second admixture preferably comprises from about 18 to about 22 weight percent ink black, from about 55 to about 60 weight percent intermediate furnace black, from about 13 to about 16 weight percent plasticizer, from about 4 to about 7 weight percent antioxidant, and from about 1 to about 3 weight percent antiozonant. Preferred carbon blacks for use in the compositions of the invention are Pearls L Black and N-231 Black. Pearls L Black is an ink black having a high surface area, and is used for reinforcing the compositions of the invention. N-231 Black is an ISAF-LM-intermediate super abrasion furnace black. Both are marketed by Cabot Corp. of Boston, Massachusetts. A preferred plasticizer for use in the compositions of the invention is coumarone-indene. A preferred antioxidant for use in the compositions of the invention is a polymerized 1,2-dihydro-2,2,4-trimethyl-quinoline. A preferred antiozonant for use in the compositions of the invention is N-(1,3 dimethylbutyl)-N-phenyl-p-phenylenediamine. According to a particularly preferred embodiment of the invention, the subject compositions preferably comprise about 34 percent of a second admixture further comprising about 20 weight percent Pearls L Black, about 59 weight percent N-231 Black, about 16 weight percent coumarone-indene, about 5 weight percent a polymerized 1,2-dihydro-2,2,4-trimethyl-quinoline, and about 2 weight percent N-(1,3 dimethylbutyl)-N-phenyl-p-phenylenediamine.

The compositions of the invention preferably further comprise up to about 0.2 weight percent tetraethyl thiuram disulfide, and most preferably, about 0.1 percent tetraethyl thiuram disulfide. A preferred tetraethyl thiuram disulfide is marketed under the trademark Ethyl Tuads by R. T. Vanderbilt & Co. of Norwalk, Connecticut.

The compositions of the invention preferably further comprise from about 0.5 to about 1.5 weight percent, and more preferably, about 0.8 weight percent benzothiazyl disulfide. Benzothiazyl disulfide functions as a primary accelerator in the compositions of the invention. A preferred benzothiazyl disulfide for use in the subject compositions is marketed under the trademark ALTAX by Goodyear Tire & Rubber Co. of Akron, Ohio. Ethyl Tuads functions as an accelerator and vulcanization agent. ALTAX is the primary accelerator and scorch-modifying secondary accelerator.

Although the foregoing ingredients have previously been recognized as suitable for use in elastomeric compositions, the unexpected improvements and durability and longevity that have been achieved with the compositions of the present invention are believed to be attributable to use of the particular formulations disclosed herein, and to the processing conditions which are further described below. Thus, for example, the relative proportions of silica, coupling agent and carbon black are believed to contribute significantly to the performance of the resultant products. Although it is possible to further increase tear resistance by increasing the relative proportion of silica, that increase will also be accompanied by an undesirable increase in compression set. If the compression set is too high, blowout preventer packer elements made with the subject composition will not return to their original size (within acceptable tolerances) after being subjected to blind closure. Similarly, it is possible to further reinforce the polymer composition by increasing the relative proportion of carbon black. However, increasing the ratio of carbon black to silica to an undesirably high level may decrease the tear resistance of the polymer composition. Thus, generally speaking, the compositions of the invention will preferably comprise carbon black and silica in a ratio of about 4 to 1.

It has further been discovered that particularly desirable results are achieved in the compositions of the invention when the cure system comprises tetraethyl thiuram disulfide and benzothiazyl disulfide in a ratio of about 1 to 7.5 by weight. When utilized in these proportions, in combination with the sulfur contained in the first admixture of the compositions, a long, slow cure is effected which makes use of most of the cure sites that are available on the polymer chain. This slow cure is further enhanced by aging the parts made with the subject compositions once they are removed from the mold in accordance with the procedures discussed below.

To make the compositions of the invention, the acrylonitrile-butadiene copolymer is preferably placed in a conventional internal mixer of the type well known to persons working in the field of rubber compounding and broken down. The fumed colloidal silica, coupling agent, sulfur, lubricant and dispersant, and activator and antiscorching agent are desirably admixed to form the first admixture of the invention, which is thereafter added to the acrylonitrile-butadiene copolymer. After sufficient mixing to disperse the first admixture throughout the acrylonitrile-butadiene copolymer, a second admixture comprising the ink black, furnace black, plasticizer, antioxidant and antiozonant is added. Following sufficient mixing to also disperse the second admixture substantially evenly throughout the acrylonitrile-butadiene copolymer, the composition is removed from the mixer and permitted to rest or wet out for at least about four hours. Following the rest period, the composition is placed on a mill, and the tetraethyl thiuram disulfide and benzothiazyl disulfide are milled into the composition until the desirable degree of dispersion is achieved. The method for making a preferred composition of the invention and for molding that composition into a blowout preventer packer element is further described and explained in the following examples:

EXAMPLE 1

100 parts by weight of KRYNAC 825 were banded to the front roll of an open mill to warm the polymer to a suitable working temperature as will be readily understood by those familiar with rubber compounding procedures. About one third of 22.25 parts by weight of a first admixture were then added to the nip of the banded KRYNAC 825 to let the components of the first admixture work into the acrylonitrile-butadiene copolymer. The first admixture comprised 13.75 parts Cab-O-Sil (to which one part bis,3,(triethoxysilyl)-propyl-tetrasulfane was previously added), 1.5 parts sulfur, one part stearic acid, and five parts zinc oxide, all parts of the first admixture being expressed as parts by weight of the total composition. After most of the first third of the first admixture had worked into the KRYNAC 825, the polymer was cut and blended well. The foregoing procedure was then repeated for the two remaining one-third aliquots of the first admixture. Sixty-four parts by weight of a second admixture further comprising 12.5 parts Pearls L Black, 37.5 parts N-231 Black, 10 parts coumarone-indene, 3 parts a polymerized 1,2-dihydro-2,2,4-trimethyl-quindine, and one part N-(1,3-dimethylbutyl)-N-phenyl-p-phenylenediamine, where all parts are expressed as parts by weight of the total composition, were then added in one-third aliquots by the same procedure utilized for addition of the first admixture. Once the first and second admixtures were well blended into the acrylonitrile-butadiene copolymer, the master batch thus produced was slabbed off the open mill and allowed to cool for at least about four hours. Following cooling, the masterbatch was banded to the front mill roll and again warmed up, after which 0.2 parts by weight Ethyl Tuads and one 1.5 parts by weight ALTAX were added to the nip of the masterbatch, blended and slabbed off as fast as possible to prevent heat buildup. The slabbed off masterbatch was then dipped and cooled in accordance with standard rubber compounding procedures.

EXAMPLE 2

Using the equipment and procedures set forth above, another composition was prepared utilizing 100 parts KRYNAC 825, 13.75 parts Cab-O-Sil MS-5, 1 part bis,3,(triethoxysilyl)-propyl, tetrasulfane, 1.5 parts sulfur, 1 part stearic acid, 5 parts zinc oxide, 13.75 parts Pearls L Black, 42.5 parts N-231 Black, 10 parts coumarone-indene, 3 parts a polymerized 1,2-dihydro-2,2,4-trimethyl-quindine, 1 part N-(1,3 dimethylbutyl)-N-phenyl-p-phenylenediamine, 0.2 parts Ethyl Tuads and 1.5 parts ALTAX, where all parts are expressed as parts by weight of the total composition.

To demonstrate the unexpectedly and significantly improved properties of blowout preventer packer elements made with the inventive compositions, a packer element was thereafter made employing a composition prepared in accordance with Example 1. Metal inserts for use in the part were first thoroughly cleaned by sand blasting, wheelabrating and degreasing to facilitate adhesion and rubber-to-metal bonding. After cleaning, two coats of adhesive were applied in a conventional manner, the first coat being Chernlok 205 and the second being Ty-Ply BN, permitting drying between application of the first and second coats. Chemlock 205 and Ty-Ply BN are adhesives for bonding rubber to metal that are marketed by Lord-Hughson Chemical Corp. of Erie, Pennsylvania. After cleaning, the inserts were carefully handled to avoid contamination of the clean surfaces.

The transfer mold utilized for making the subject part was then sprayed with a dry lubricant, and the ring and plunger were also lubricated. The mold was preheated to a temperature between 82° and 93° C. (180°–200° F.), with the temperature being checked at four positions inside the mold. The center plate and mold bottom were thereafter assembled and the serial number and material code were placed inside the mold. With clean gloves, a centrally disposed mandrel, a rubber pad and the inserts were placed in the mold and the top plate was positioned over the mold. After positioning the plunger and closing the mold, the press was actuated to transfer the rubber from the transfer pot into the mold and the composition was thereafter step-cured by curing for 30 minutes without using a steam jacket, followed by three hours at 126° C. (260° F.) with a steam jacket, and three hours at 148° C. (300° F.) with a steam jacket. After transfer of the rubber into the mold, the mold pressure should preferably not exceed about 2,000 psi. Following curing within the mold as described above, the mold was hoisted to the floor and the top was lifted off after knife cutting the flash at the parting line. After hammering out the mandrel sections, the part was lifted from the mold base, inspected, placed on a wooden pallet, and aged for about two weeks prior to testing. Aging of the part outside the mold at ambient conditions is believed to be a significant part of the curing process. According to a preferred embodiment of the invention, the parts should be aged under ambient conditions outside the mold for at least seven, and preferably fourteen, days on a nonmetallic surface prior to testing for use. This aging period permits further cross-linking of the polymer as the part continues to cool. Where parts are not aged in the manner provided herein, they are less likely to achieve the number of closures that would otherwise be attainable prior to failure. Moreover, when subjected to blind closures, they may be prevented by a higher resultant compression set from recovering as quickly to their original dimensions, if at all.

While this invention has been described herein in relation to its preferred embodiments, other alterations and modifications of the invention will become apparent to one of ordinary skill in the art upon reading the present disclosure and it is intended to cover all such modifications and alterations as fall within the scope of the appended claims.

What is claimed is:

1. A rubber composition comprising from about 45 to about 55 weight percent of an acrylonitrile-butadiene copolymer; from about 10 to about 15 weight percent of a first admixture further comprising a major amount of colloidal silica and minor effective amounts of coupling agent, curative, lubricant, dispersant, activator and antiscorching agent; from about 30 to about 40 weight percent of a second admixture further comprising a major amount of carbon black, wherein the carbon black to silica ratio is about 4 to 1, and minor effective amounts of plasticizer, antioxidant and antiozonant; and minor effective amounts of tetraethyl thiuram disulfide and benzothiazyl disulfide wherein the ratio of the tetraethyl thiuram disulfide to the benzothiazyl disulfide is about 1 to 7.5 by weight.

2. The composition of claim 1 wherein said acrylonitrile-butadiene copolymer has a bound acrylonitrile content of from about 36 to about 45 weight percent.

3. The composition of claim 2 wherein said first admixture further comprises from about 55 to about 65 weight percent fumed colloidal silica, from about 4 to about 6 weight percent coupling agent, from about 6 to about 10 weight percent curative, from about 4 to about 6 weight percent lubricant and dispersant, and from about 20 to about 25 weight percent activator and antiscorching agent.

4. The composition of claim 3 wherein said coupling agent is bis,3,(triethoxysilyl)-propyl-tetrasulfane.

5. The composition of claim 3 wherein said curative is sulfur.

6. The composition of claim 3 wherein said lubricant and dispersant is stearic acid.

7. The composition of claim 3 wherein said activator and antiscorching agent is a metallic oxide.

8. The composition of claim 7 wherein said metallic oxide is zinc oxide.

9. The composition of claim 2 wherein the carbon black component of said second admixture further comprises a major portion of furnace black and a minor portion of ink black.

10. The composition of claim 9 wherein said second admixture further comprises from about 55 to about 60 weight percent furnace black.

11. The composition of claim 9 wherein said second admixture further comprises from about 18 to about 22 weight percent ink black.

12. The composition of claim 1 wherein said second admixture preferably comprises from about 18 to about 22 weight percent ink black, from about 55 to about 60 weight percent furnace black, from about 13 to about 16 weight percent plasticizer, from about 4 to about 7 weight percent antioxidant, and from about 1 to 3 weight percent antiozonant.

13. The composition of claim 12 wherein said plasticizer is coumarone-indene.

14. The composition of claim 12 wherein said antioxidant is a polymerized 1,2-dihydro-2,2,4-trimethyl-quinoline.

15. The composition of claim 12 wherein said antiozonant is N-(1,3 dimethylbutyl)-N-phenyl-p-phenylenediamine.

16. The composition of claim 1 wherein said tetraethyl thiuram disulfide is present in an amount ranging up to about 2 percent by weight of the total composition.

17. The composition of claim 1 wherein said benzothiazyl disulfide is present in an amount ranging from about 0.5 to about 1.5 percent by weight of the total composition.

18. A polymer composition comprising from about 45 to about 55 weight percent of an acrylonitrile-butadiene copolymer having a bound acrylonitrile content of about 36 weight percent and a raw polymer viscosity when measured according to ASTM D 1646 (ML-1+4' at 100° C.) of about 47; from about 10 to about 15 weight percent of a first admixture further comprising from about 55 to about 65 weight percent fumed colloidal silica, from about 4 to about 6 weight percent bis,3,(-triethoxysilyl)-propyl-tetrasulfane, from about 6 to about 10 weight percent sulfur, from about 4 to about 6 weight percent stearic acid, and from about 20 to about 25 weight percent zinc oxide; from about 30 to about 40 weight percent of a second admixture further comprising from about 18 to about 22 weight percent ink black, from about 55 to about 60 weight percent intermediate furnace black, from about 13 to about 16 weight percent coumarone-indene, from about 4 to about 7 weight percent of a polymerized 1,2-dihydro-2,2,4-trimethyl-quinoline, and from about 1 to about 3 weight percent N-(1,3 dimethylbutyl)-N-phenyl-P-phenylenediamine; from about 0.05 to about 0.2 weight percent tetraethyl thiuram disulfide, and from about 0.5 to about 1.5 weight percent benzothiazyl disulfide.

19. A packer element for a blowout preventer comprising a plurality of circumferentially spaced-apart metal inserts having a rubber composition molded therearound, said rubber composition comprising from about 45 to about 55 weight percent of an acrylonitrile-butadiene copolymer; from about 10 to about 15 weight percent of a first admixture further comprising a major amount of fumed colloidal silica and minor effective amounts of bis,3,(triethoxysilyl)-propyl-tetrasulfane, sulfur, stearic acid and zinc oxide; from about 30 to about 40 weight percent of a second admixture further comprising a major amount of carbon black, wherein the carbon black to silica ratio is about 4 to 1, and minor effective amounts of coumarone-indene, an antioxidant, and an antiozonant; and minor effective amounts of tetraethyl thiuram disulfide and benzothiazyl disulfide wherein the ratio of the tetraethyl thiuram disulfide to the benzothiazyl disulfide is about 1 to 7.5 by weight.

20. The packer element of claim 19 wherein said antioxidant is a polymerized 1,2-dihydro-2,2,4-trimethylquinoline.

21. The packer element of claim 19 wherein said antiozonant is N(1,3 dimethylbutyl)-N-phenyl-p-phenylenediamine.

22. The packer element of claim 19 wherein said first admixture further comprises from about 55 to about 65 weight percent fumed colloidal silica, from about 4 to about 6 weight percent bis,3,(triethoxysilyl)-propyl-tetrasulfane, from about 6 to about 10 weight percent sulfur, from about 4 to about 6 weight percent stearic acid, and from about 20 to about 25 weight percent zinc oxide.

23. The packer element of claim 19 wherein said second admixture preferably comprises from about 18 to about 22 weight percent ink black, from about 55 to about 60 weight percent furnace black, from about 13 to about 16 weight percent coumarone-indene, from about 4 to about 7 weight percent of a polymerized 1,2-dihydro-2,2,4-trimethylquinoline, and from about 1 to about 3 weight percent of N(1,3 dimethylbutyl)-N-phenyl-p-phenylenediamine.

24. An annular packer element for a Type GK blowout preventer, said packer element comprising an annulus of rubber molded around a plurality of circumferentially spaced metal inserts, said rubber comprising from about 45 to about 55 weight percent of an acrylonitrile-butadiene copolymer having a bound acrylonitrile content of about 36 weight percent and a raw polymer viscosity when measured according to ASTM D 1646 (ML-1+4' at 100° C.) of about 47; from about 10 to about 15 weight percent of a first admixture further comprising from about 55 to about 65 weight percent fumed colloidal silica, from about 4 to about 6 weight percent bis,3,(triethyloxysilyl)-propyl-tetrasulfane, from about 6 to about 10 weight percent sulfur, from about 4 to about 6 weight percent stearic acid, and from about 20 to about 25 weight percent zinc oxide; from about 30 to about 40 weight percent of a second admixture further comprising from about 18 to about 22 weight percent ink black, from about 55 to about 60 weight percent intermediate furnace black, from about 13 to about 16 weight percent coumarone-indene, from about 4 to about 7 weight percent of a polymerized 1,2-dihydro-2,2,4-trimethyl-quinoline, from about 1 to about 3 weight percent N-(1,3 dimethylbuty l)-N-phenyl-p-phenylenediamine; from about 0.05 to about 0.2 weight percent tetraethyl thiuram disulfide, and from about 0.5 to about 1.5 weight percent benzothiazyl disulfide.

* * * * *